United States Patent [19]
LaFlame

[11] 4,302,156
[45] Nov. 24, 1981

[54] ELECTRO-VISCOUS FAN CLUTCH ASSEMBLY

[75] Inventor: Frank E. LaFlame, Dayton, Ohio

[73] Assignee: General Motors Corporation, Detroit, Mich.

[21] Appl. No.: 94,809

[22] Filed: Nov. 16, 1979

[51] Int. Cl.³ .................... F01D 7/08; F16D 29/00
[52] U.S. Cl. ................ 416/169 A; 123/41.12; 192/58 B; 192/82 T; 416/32
[58] Field of Search ............. 416/32, 39, 169 A; 123/41.12; 192/58 B, 82 T

[56] References Cited

U.S. PATENT DOCUMENTS

| | | | |
|---|---|---|---|
| 1,934,783 | 11/1933 | Arterburn | 192/82 T |
| 3,227,254 | 1/1966 | Sutaruk | 123/41.12 X |
| 3,268,041 | 8/1966 | Roper | 192/82 T |
| 3,858,697 | 1/1975 | Brewer et al. | 123/41.12 X |
| 4,056,178 | 11/1977 | Detty | 192/58 B |

FOREIGN PATENT DOCUMENTS 2804859  8/1979  Fed. Rep. of Germany .... 192/58 B

*Primary Examiner*—Leonard E. Smith
*Attorney, Agent, or Firm*—Charles R. White

[57] ABSTRACT

Electro-viscous fan clutch having an electromagnet carried by a rotatable pump plate within the confines of the clutch housing. The electromagnet controls a spring arm valve element which is deflected to a spring loaded position by the generated magnetic field so that viscous clutch operation is terminated. On deenergization of the electromagnet, the valve element springs back to a position in which the fluid gate is opened to allow viscous operation of the clutch for engine cooling.

3 Claims, 4 Drawing Figures

ELECTRO-VISCOUS FAN CLUTCH ASSEMBLY

This invention relates to engine cooling fan and clutch assemblies and more particularly to an electro-viscous fan clutch featuring a fluid controlling an electrically energizable electromagnet internally secured to a rotatable pump plate providing rapid viscous clutch operation in response to changes in engine coolant temperature and assuring fan operation for engine protection in the event of malfunction of electrical controls.

Prior to the present invention, various viscous clutch designs have been employed for the fluid drive of a fan by the vehicle engine or an electric motor in response to signals reflective of engine temperature. The majority of such fan clutches employ a bimetal coil sensing engine temperatures to control an inlet or discharge valve hydraulically connected to the viscous clutch. While the prior clutch designs are generally meritorious, hysteresis occuring in clutch operation detracted from cooling efficiency and from engine fuel economy.

This invention replaces the bimetal thermostatic coil and the valve means actuated thereby with a new and improved electrically energizable electromagnetic device rotatably mounted within the confines of the clutch and secured directly to the pump plate. With this construction, the electromagnet is connected by an electric lead from the front of the clutch assembly and is operatively connected to a temperature sensor disposed directly within the engine coolant for more responsive clutch operation.

In the preferred embodiment of this invention, an electromagnet assembly is rigidly secured to a rotatable pump plate so that on energization of the electromagnet a spring control arm will be attracted by the generated magnetic field and arcuately deflected to a spring loaded position along the face of the pump plate to close a viscous fluid gate leading to the viscous clutch for fan drive. With the gate closed, clutching fluid from a reservoir will be blocked from entry into the fluid shear area of the viscous clutch. Pumping components of the pump plate will exhaust the fluid from the shear zone to terminate fluid drive of the fan. By deenergization of the electromagnet, the magnetic field will be terminated so that the gate will be opened by the spring deflection of the control arm to its relaxed position. With an open gate, fluid is supplied to the viscous clutch for fan drive. In the event of failure of the electrical controls, this invention assures engine cooling since the gate is opened by the spring action of the control arm when the electromagnet is not functioning.

A feature, object and advantage of this invention is to provide new and improved control of an engine cooling fan clutch having fan controls closely associated with the engine coolant temperature preferably through the use of a sensor within the engine cooling fluid to provide for quicker response to engine temperature changes so that the fan operates only when required to thereby improve engine efficiency and fuel economy of the vehicle.

Another feature, object and advantage of this invention is to provide a new and improved electroviscous clutch for an engine cooling fan in which an electromagnet device for controlling the viscous clutch is carried by a rotatable pump plate housed within a chamber of a fan body and enclosed by a cover plate.

Another feature, object and advantage of this invention is to provide a new and improved electroviscous clutch for an engine cooling fan blade which has a rotatable electromagnet controlling the supply of fluid to the clutch carried by a pump plate internally mounted within the clutch housing and assembled into a compact package that responds to engine coolant signals to quickly activate and deactivate the fluid drive so that clutch hysteresis is minimized.

Another feature, object and advantage of this invention is to provide a new and improved electroviscous fluid clutch for a fan drive in which fluid is transmitted from a reservoir through a fluid supply gate in the pump plate and controlled by a spring arm; an electromagnetic device energizable to deflect and load the spring arm to a position blocking the gate to allow the clutch to be exhausted of clutching fluid; on deenergization of the electromagnetic device, the spring arm recovers to a position uncovering the gate so that viscous fluid is fed to the clutch to assure engine protection in the event of electrical failure of electromagnet controls.

These and other features, objects and advantages of this invention will be more apparent from the following detailed description and drawings in which.

Figure 1:
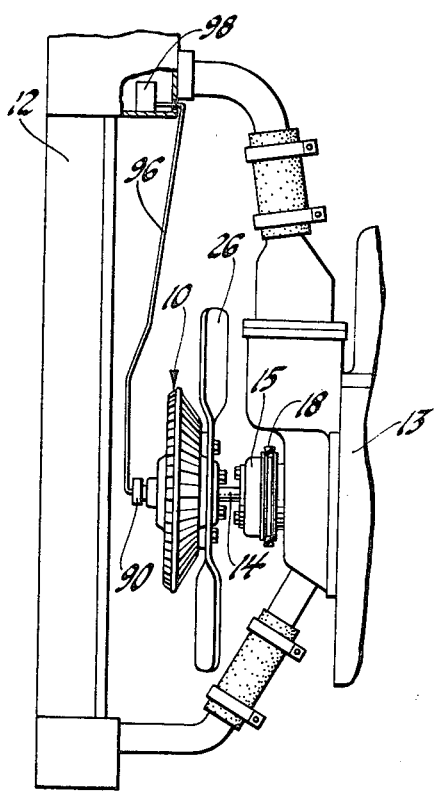
FIG. 1 is a side elevational view of a radiator and an engine having an electromagnetic viscous fluid clutch and associated cooling fan.
Figure 2:
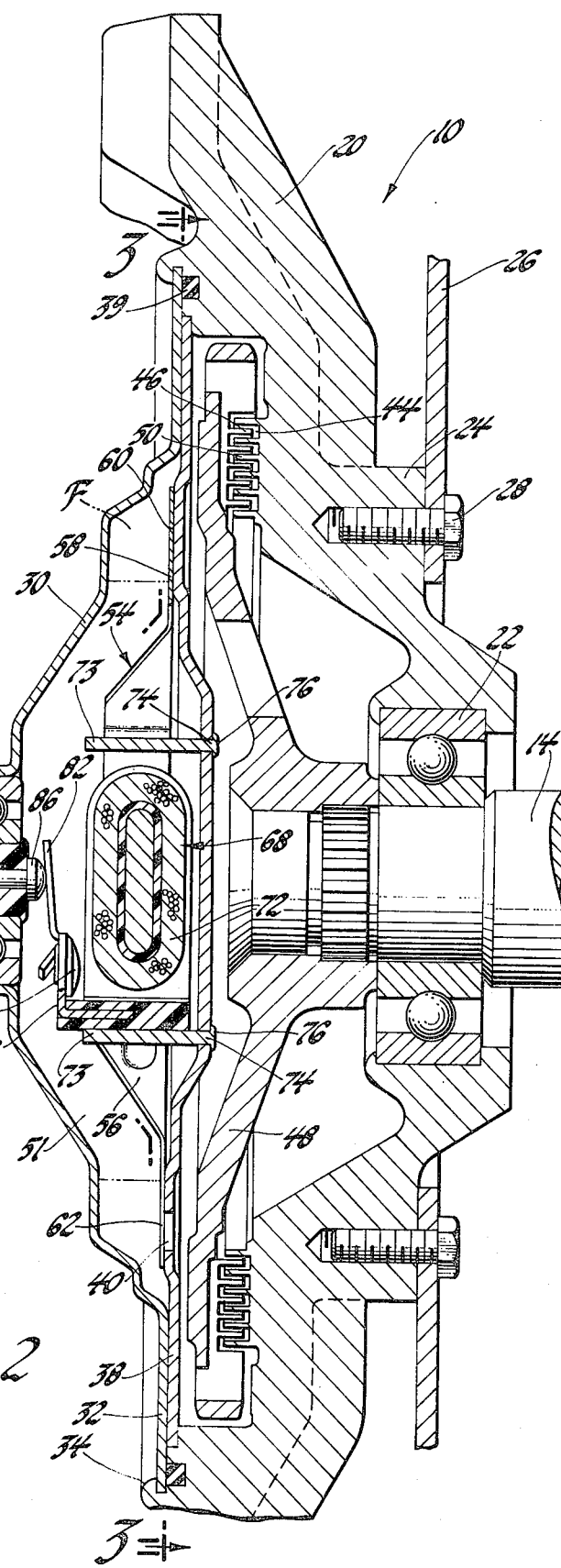
FIG. 2 is an enlarged fragmentary cross sectional view of the electromagnetic viscous fluid clutch of FIG. 1 embodying this invention.

Turning now in greater detail to the drawings, there is shown in FIG. 1 a multibladed fan and clutch assembly 10 for drawing cooling air through the core of a vehicle radiator 12 through which engine cooling fluid from vehicle engine 13 is circulated. This assembly 10 is mounted on the outboard end of a rotatably driven shaft 14 whose inner end terminates in a flange secured to a water pump pulley 15. The pulley 15 and shaft 14 attached thereto are rotatably driven by engine 13 through a conventional drive belt 18. As shown in FIG. 2, the fan and clutch assembly comprises a dished main body 20 centrally mounted for rotation on shaft 14 by bearing 22. The main body 20 is formed with a plurality of radially extending bosses 24 to which a bladed fan 26 is attached by threaded fasteners 28. A cover 30 fabricated from thin sheet metal is mounted to the front of the main body 20 and cooperates therewith to form a closed chamber within which are housed the components of the electromagnetic viscous clutch of this invention. These components are controlled by signals reflecting engine coolant temperatures to drivingly connect and disconnect the fan with respect to the engine driven shaft 14.

The cover 30 is a thin-walled, dish-like member which has a radial flange 32 peripherally secured to the main body by the annular upset or spun over portion 34 of the main body 20. Disposed immediately behind cover 30 is a disc-like annular pump plate 38 of sheet metal whose diameter is slightly less than that of the cover 30. This pump plate is drivingly secured to the main body 20, being trapped on the main body by the cover flange 32 and cooperating upset portion 34. Annular seal 39 interposed between the cover flange 32 and the main body prevents fluid leakage outwardly from the clutch assembly 10.

The pump plate has a small rectangular opening formed therein which provides a gate or slot 40 which when opened directs a flow of silicone clutching fluid into an annular fluid shear zone 44 formed by the space between the interleaved annular ridges 46 of a rotating clutch plate 48 and corresponding annular ridges 50 formed on the inner surface of the main body 20. Fluid sheared in this zone transmits input torque from the rotatably driven clutch plate, centrally splined to shaft 14, to main body 20 to provide the hydraulic drive of body 20 and the bladed fan 26 attached thereto.

A reservoir 51 formed between the cover 30 and the pump plate 38 contains a quantity of silicone clutching fluid F which circulates in a toroidal path when the clutch assembly is rotatably driven. The opening and closing of the gate 40 for control of the supply of the clutching fluid to the shear zone 44 is through an arm assembly 54 which includes an elongated spring arm 56 having a flattened end 58 spot welded at 60 to the outer face of the pump plate. The free end of this spring arm terminates in a rectangular head portion 62 which is flat and lies against the surface of the pump plate and which is adapted to cover the gate 40 under predetermined operating conditions.

Figure 3:
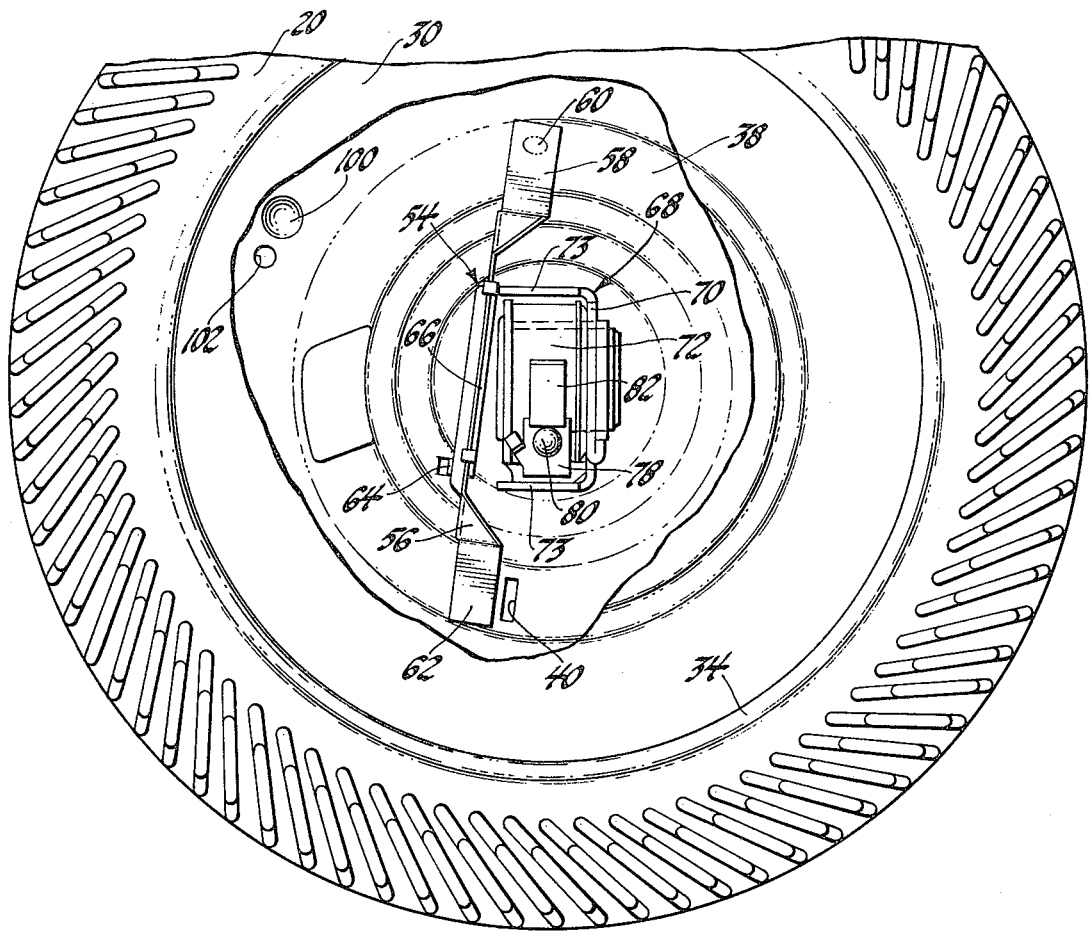
FIG. 3 is a view taken along lines 3—3 of FIG. 2 as viewed in the direction of the indicator arrows.

FIG. 3 shows the normal undeflected position of the spring arm 56 in which the back of the arm rests against a stop 64 struck upwardly from the pump plate. In this position, the head portion 62 is displaced from the gate or opening 40 to permit sufficient quantities of the clutching fluid to flow into the shear zone for hydraulic drive of the fan 26 so that the temperature of the engine coolant circulating through the radiator will be reduced by air pumped by the fan.

Figure 4:
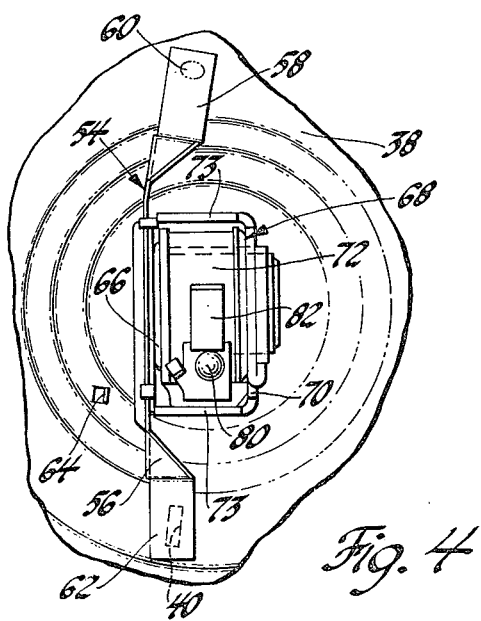
FIG. 4 is a view of a portion of FIG. 3 showing viscous clutch valving means in the closed position whereby there is no viscous drive of the fan.

The spring arm carries a steel contact bar 66 which when attracted by the field of an electrically energizable electromagnet assembly 68, is deflected to FIG. 4 position in which the head portion 62 blocks the gate 40 to cut off the supply of silicone fluid to the shear zone 44 to eliminate or sharply reduce the hydraulic drive of the fan. The electromagnet assembly 68 has a U-shaped steel bracket 70 which supports the electromagnet coil 72. The side arms 73 of the bracket are formed with projections 74 which extend through corresponding openings in the pump plate. The ends of these projections are upset at 76 to stake the coil assembly to the pump plate for rotation therewith. The coil 72 has an outer lead not shown connected to an outwardly extending terminal 78 forming part of assembly 68 which is secured by a rivet 80 to a spring steel terminal contact 82 that extends radially inwardly to the rotational axis of the clutch and into engagement with a head portion 86 of an axially extending terminal 88 mounted in a molded insert 90 centrally supported by bearing 92 in the cover 30. The terminal 88 is electrically connected by a conductor 96 to a sensor 98 electrically connected to the vehicle ignition circuitry and mounted within the radiator 12 for sensing the temperature of the engine coolant circulated therein.

When the temperature of the coolant in the radiator rises to a predetermined elevated temperature, the sensor will open so that the electromagnet is deenergized and the spring arm will spring back to the FIG. 3 position to open gate 40 for the fluid drive of the main body 20 and the bladed fan attached thereto.

With the gate 40 opened, a cylindrically projecting pumping element 100 pressed in the pump plate, pumps fluid through a discharge orifice 102 formed in the pump plate back into the reservoir.

When the temperature of the coolant falls below the predetermined elevated temperature and the cooling fan operation is no longer needed, the sensor closes to effect energization of the electromagnet which attracts and displaces the spring arm so that the gate 40 is closed.

With the gate 42 closed and with the shear area being evacuated of silicone fluid by the pumping element, the viscous drive of the fan blade will be substantially terminated so that no appreciable energy is utilized for fan operation resulting in improved vehicle fuel economy.

With this invention, there is improved mounting of the electromagnet entirely within the clutch to improve service life. Furthermore, there are no special bearing constructions required to support the electromagnet since effective use is made of the pump plate for this purpose. It will be further appreciated that the viscous clutch will be operative for viscous fan drive and engine protection in the event of failure of coil operation since the spring arm normally opens the gate 40.

With this invention, there is more efficient use of fan cooling and improved fuel economy since rapid clutch operation is provided allowing the clutch to be left off longer as compared to various prior viscous clutch designs.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A bladed fan and clutch assembly for inducing a flow of cooling air through a radiator in which engine coolant is circulated comprising a shaft member adapted to be rotatably driven, first fluid clutch means operatively connected to said shaft member for rotation therewith, second fluid clutch means axially spaced from said first fluid clutch means to form a fluid shear space therebetween for receiving a fluid so that said second fluid clutch means can be rotatably driven by said first fluid clutch means when said first clutch means is driven and a supply of fluid is fed into said shear space, fan blade means secured to said second clutch means and extending radially outwardly therefrom, a cover plate attached to said second clutch means to form a fluid reservoir therein, a quantity of fluid stored in said reservoir, a pump plate having pumping means to pump fluid from said shear space to said reservoir, said reservoir being hydraulically separated from said clutch means by said pump plate, valve means to control the flow of fluid between said reservoir and said shear space, said valve means comprising a gate in said pump plate forming a hydraulic fluid passage between said reservoir and said shear space and a spring arm mounted for sliding movement on said clutch plate between predetermined positions for opening and closing said gate and electromagnetic means mounted directly on said pump plate adjacent to said spring arm for rotation with said pump plate, said electromagnet means being electrically energizable for slidably moving said spring arm to one of said positions to control the supply of fluid into said shear space from said reservoir and thereby control the viscous drive of said second clutch means by said first clutch means and the drive of said fan blades.

2. A bladed fan and clutch assembly for circulating air through a radiator in which engine coolant is circulated, an elongated shaft member adapted to be rotatably driven, first fluid clutch means operatively connected to said driven shaft for rotation therewith, second fluid clutch means rotatably mounted on said shaft and spaced from said first fluid clutch means to form a fluid shear zone therebetween for receiving a fluid adapted to be sheared so that said second fluid clutch means can be rotatably driven by said first fluid clutch means when a supply of fluid is interposed into said shear zone, fan blade means secured to said second clutch means and extending radially outwardly therefrom, a cover plate attached to said last mentioned clutch means to form a fluid reservoir therein, a quantity of fluid stored in said reservoir, a pump plate, said reservoir being hydraulically separated from said first and second clutch means by said pump plate, pumping means on said pump plate for pumping fluid from said shear zone to said reservoir, spring arm control means carried by said pump plate to control the flow of fluid between said reservoir and said shear zone, and electrically energizable electromagnetic means supported by said pump plate for moving said spring arm control means to thereby control the supply of fluid into said shear zone from said reservoir and thereby effect the viscous drive of one of said second clutch means and said fan blades by said first clutch means.

3. A bladed fan and clutch assembly for inducing air flow through a radiator in which engine coolant is circulated comprising a shaft adapted to be rotatably driven, first rotatable clutch means operatively connected to said shaft for rotation therewith, a housing for such first clutch means rotatably supported by said shaft, said housing having second clutch means formed thereon and spaced from said first clutch means to provide a fluid shear zone therebetween, fan means secured to said housing and extending radially therefrom, a cover plate attached to said housing to form a chamber therewith, a pump plate secured to said housing and operatively disposed between said cover plate and said first clutch means to form a fluid reservoir and to pump fluid from said shear zone to said reservoir, said pump plate having a fluid gate therein for conducting fluid from said reservoir into said fluid shear zone, spring valve means mounted on said pump plate means and movable between open and closed position with respect to said fluid gate for controlling the flow of fluid through said gate from said reservoir into said shear zone to thereby control the transmission of torque through said clutch, electromagnetic actuator means energizable to produce a magnetic field attracting said spring valve means to move said spring valve means to an open position for the viscous drive of said second clutch means, and means mounting said electromagnetic actuator means directly to said pump plate for rotation therewith.

* * * * *